United States Patent

[11] 3,569,868

[72] Inventors Kimio Suzuki; Ryogo Hirota, Tokyo, Japan
[21] Appl. No. 802,161
[22] Filed Feb. 25, 1969
[45] Patented Mar. 9, 1971
[73] Assignee RCA Corporation

[54] NONRECIPROCAL MICROWAVE DEVICES USING A SEMICONDUCTOR ELEMENT
7 Claims, 10 Drawing Figs.

[52] U.S. Cl. .......... 333/1.1, 333/6, 333/24.1, 333/24.2
[51] Int. Cl. .......... H01p 1/32, H01p 5/12
[50] Field of Search .......... 307/309; 333/1.1, 6, 24, 24 (G), 24.1, 24.2, 9, 1

[56] References Cited

UNITED STATES PATENTS

| | | | |
|---|---|---|---|
| 2,911,601 | 11/1959 | Gunn et al. | (333/24G) |
| 3,105,946 | 10/1963 | Beljers et al. | 333/24.2 |
| 3,289,110 | 11/1966 | Weiss | 33/24.1 |
| 3,321,718 | 5/1967 | Alfandari et al | (333/24.1) |
| 3,382,464 | 5/1968 | Gremillet | 333/24(G) |

OTHER REFERENCES

Barlow et al, Microwave Propagation in a waveguide containing a semiconductor to which is applied a steady transverse magnetic field, Proc. IEE, Dec. 1963 Pg. 2177— 2181 333— 24.1

Koike et al, Microwave Measurements on the Magneto-Resistance Effect In Semi-conductors, The Inst. of E.E. Paper No. 3780E, Mar. 1962, Pg. 139— 144 333— 24.1

Uebele, Characteristics of Ferrite Microwave Limiters, IEEE Trans. on MTT, Jan. 1959 Pg. 21 relied on 333— 24.2

*Primary Examiner*—Herman Karl Saalbach
*Assistant Examiner*—Paul L. Gensler
*Attorney*—Edward J. Norton

ABSTRACT: Nonreciprocal microwave devices operable at room temperature using semiconductor elements with decreased magnetic field bias in waveguides are provided herein by a reduced thickness of the semiconductor material.

Figures 1, 2, 3, 4, 5, 6:
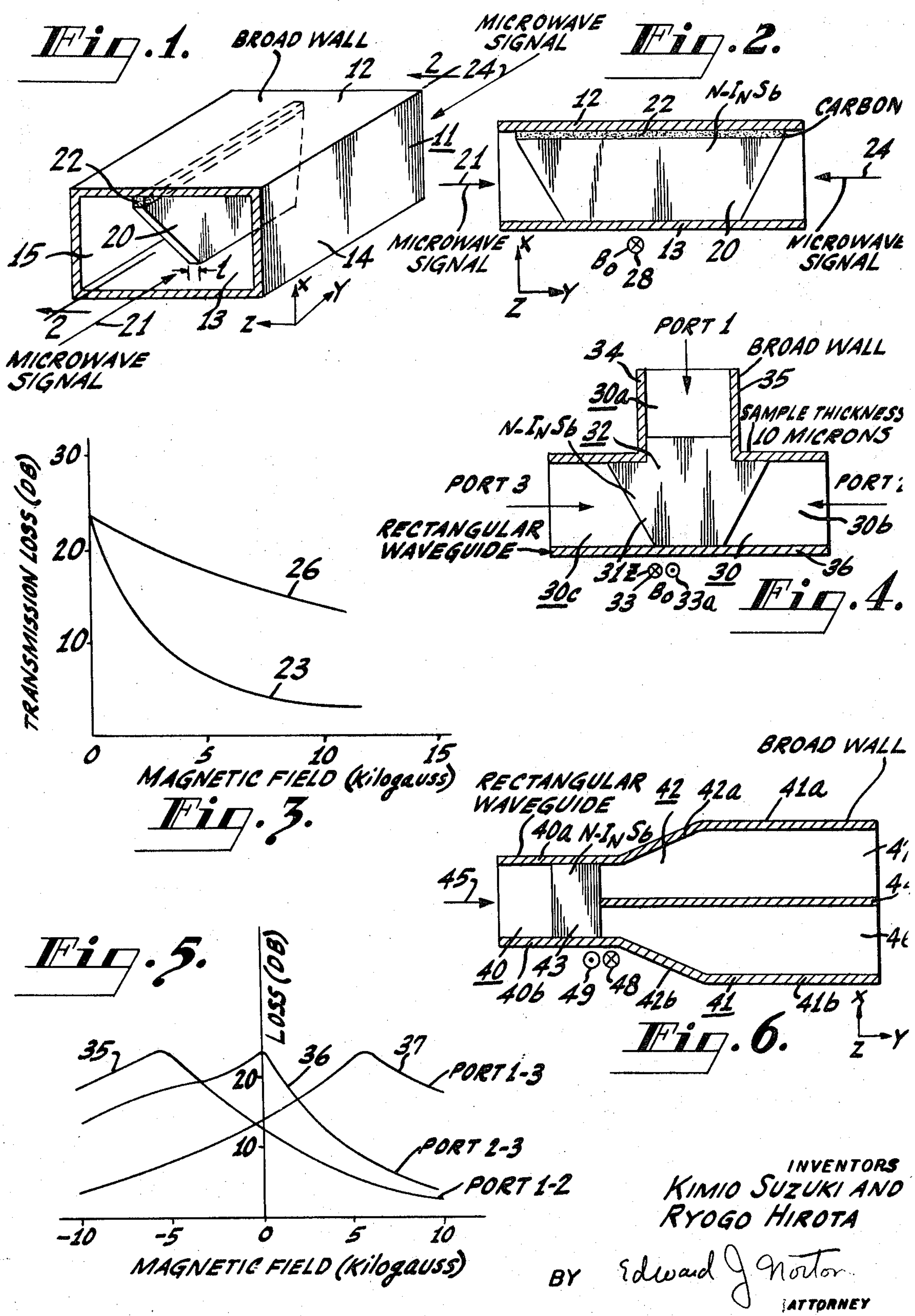

INVENTORS
KIMIO SUZUKI AND
RYOGO HIROTA

BY Edward J Norton
ATTORNEY

INVENTORS
KIMIO SUZUKI AND
RYOGO HIROTA

BY Edward J. Norton
ATTORNEY

NONRECIPROCAL MICROWAVE DEVICES USING A SEMICONDUCTOR ELEMENT

BACKGROUND OF THE INVENTION

This invention relates to microwave devices using a semiconductor element mounted in waveguides and, particularly, to nonreciprocal microwave devices using semiconductor material which are operable at room temperature without requiring magnetic fields greater than 50 kilogauss.

When a strong magnetic field is applied to a semiconductor which is mounted in a waveguide, nonreciprocal waveguide propagation has been observed. For a further discussion see "-Propagation in a Solid State Plasma Waveguide in a Transverse Magnetic Field" by Toda, Journal of the Physical Society of Japan, Vol. 19, No. 7, 19, No.7,Jul. 1964. and "Theory of a Solid State Plasma Waveguide in a Transverse Magnetic Field" by Hirota, Journal of the Physical Society of Japan, Vol. 19, No. 7, Jul. 1964. This nonreciprocity of microwave propagation is provided by the field displacement effect in the semiconductor material. When a magnetic field is applied in a given direction to a semiconductor transverse to the direction of propagation of a microwave signal applied to the semiconductor material, Hall current perpendicular to both is produced. The space charge and the R.F. (radio frequency) magnetic field resulting from the Hall current couple with the electric and magnetic fields of the microwave energy propagating in the waveguide. The direction of the Hall current flow depends on the direction of the external magnetic field. Reversing the direction of the external magnetic field interchanges the waveguide sides having the strong and weak microwave energies. Nonreciprocal microwave devices using semiconductor elements and that operate as described above are known. These prior known devices are either operated at liquid nitrogen temperatures and/or biased by magnetic fields on the order of $10^2$ to $10^3$ kilogauss. One of the reasons why nonreciprocal microwave propagation using semiconductor devices at room temperature when biased by lower magnetic fields has not been developed is that the carrier density of semiconductor materials such as *n*-type InSb (Indium antimonide) is many times greater (100 times for high purity *n*-type INSb) at room temperature than it is at liquid nitrogen temperature. This greatly increased carrier density results in a substantial decrease in nonreciprocity without a substantial increase in magnetic field bias. In other materials such as Ge (Germanium) where the carrier density is not such as would require a larger external magnetic field, the carrier mobility is small and no strong nonreciprocity has been observed.

It is an object of the present invention to provide room temperature nonreciprocal semiconductor microwave devices operable with an applied external magnetic field substantially less than 50 kilogauss.

Briefly, this and other objects of the present invention are accomplished by placing a semiconductor material in a transmission line so as to be coupled to the electric and magnetic fields of a microwave signal propagating in the transmission line. An external magnetic field is applied perpendicular to the direction of propagation of the microwave signal and in the direction of the internal magnetic field. The thickness of the semiconductor material in the direction of the applied external magnetic field is arranged so as to be small compared to the wavelength of the propagating wave in the semiconductive material at the particular frequency used.

Figures 7, 8:
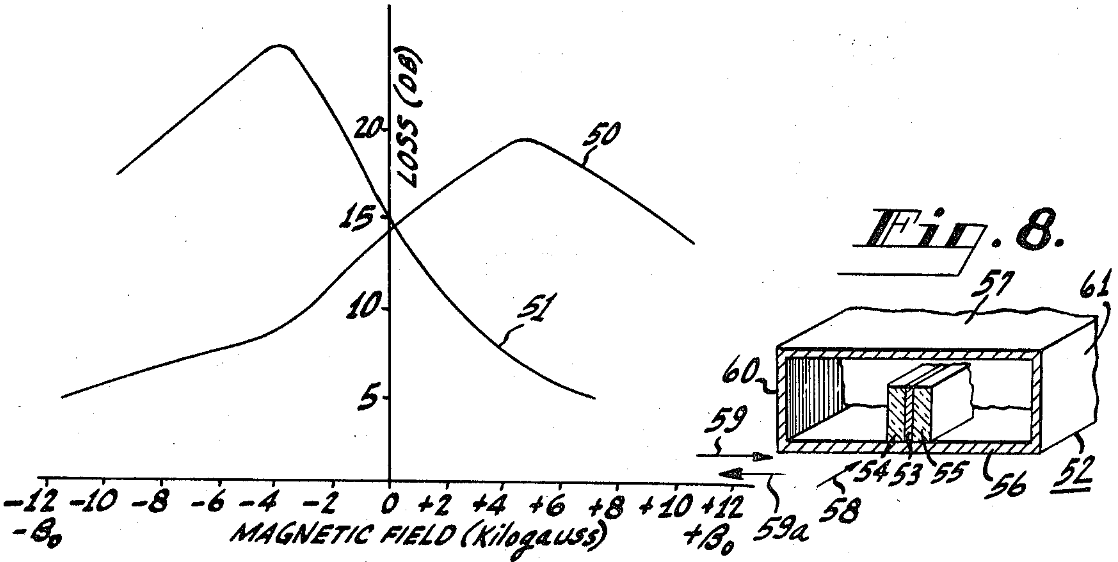
Figure 9:
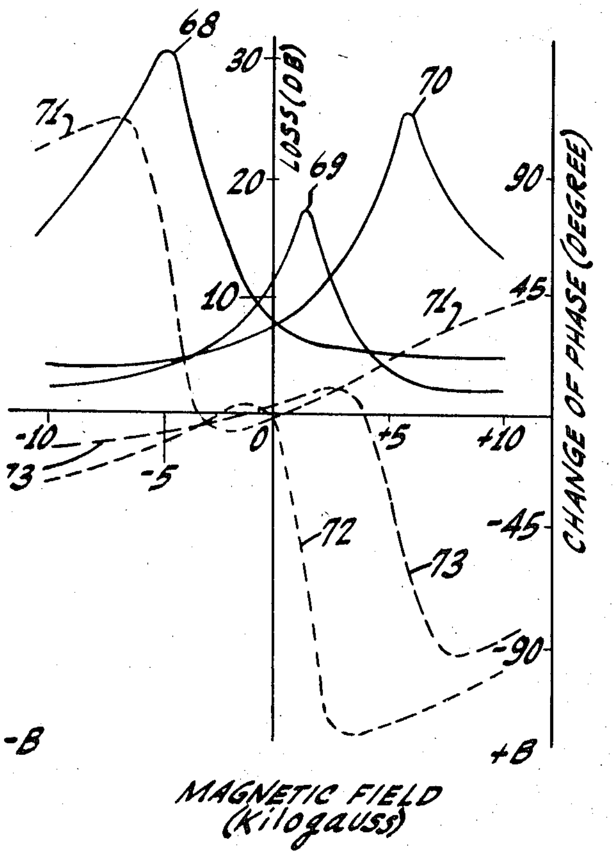
Figure 10:
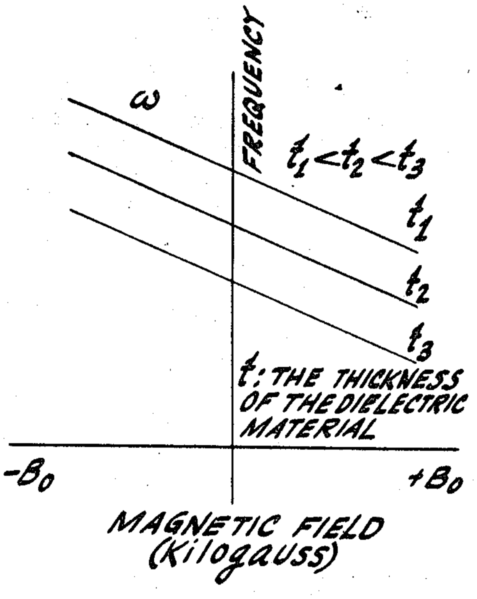

Novel features of the present invention both as to method and organization as well as additional objects and advantages thereof will be understood more fully from the following detailed description when read in connection with the accompanying drawings in which:

FIG. 1 is a perspective view of a waveguide isolator constructed in accordance with the present invention, FIG. 2 is a sectional view of the isolator shown in FIG. 1 taken in the 2–21 plane, FIG. 3 illustrates the transmission loss versus magnetic field for an isolator like that shown in FIGS. 1 and 2, FIG. 4 is a sectional view of a circulator constructed in accordance with an embodiment of the invention, FIG. 5 illustrates the transmission loss (db.) vs. magnetic field (kilogauss) for a circulator configuration like that shown in FIG. 4, FIG. 6 is a sectional view of a power divider constructed in accordance with another embodiment of the present invention, FIG. 7 illustrates transmission loss (db.) vs. magnetic field (kilogauss) for the configuration shown in FIG. 6, FIG. 8 is a perspective view of a nonreciprocal microwave device using a thin slab of semiconductor material sandwiched between two high dielectric slabs, FIG. 9 illustrates the relation between the magnetic field and the change of microwave phase (degrees) and transmission loss (db.) for the configuration shown in FIG. 8, and FIG. 10 illustrates the relation between magnetic field and microwave frequency.

Referring to FIG. 1, there is shown a waveguide 11 having broad walls 12 and 13 and narrow walls 14 and 15. The waveguide is dimensioned and arranged so as to support the propagation of electromagnetic waves in the K-frequency band in the $TE_{10}$ mode. A trapezoidal shaped slab 20 of semiconductor material, for example, *n*-type indium antimonide (InSb) is mounted between the broad walls 11 and 12 and centered between the narrow walls 14 and 15 of the waveguide. The end of the trapezoidal shaped slab 20 near broad wall 12 is covered with a carbon powder 22 to absorb the microwave signal which propagates near the wall 12. The slab is mounted parallel to the RF electric field and at the center of the K-band waveguide 11. A microwave signal at K-band (18—26kmc) is applied in the Y-direction indicated by arrow 21 and is propagated through the waveguide in the $TE_{10}$ mode. An external transverse magnetic field in the Z-direction of FIG. 1 is applied across the thickness of the slab 20 of semiconductor material. By making the thickness $t$ in the Z-direction less than 20 microns, it has been observed that, at room temperature when applying external magnetic fields of the order of 10 kilogauss, nonreciprocal action takes place. It is believed that this nonreciprocal action is caused by the Hall current wherein the microwave signal in one direction is made to propagate along the attenuating carbon side 12 of the waveguide 11 as the microwave signal propagates along this side 12 due to the Hall current in the direction Y. Signals propagating in the opposite Y-direction through waveguide 11 are propagated along the opposite conductive side 13 and where no appreciable attenuation occurs.

FIG. 3 illustrates the insertion loss for an arrangement like that shown in FIG. 1 wherein the sample thickness in the Z-direction was of the order of 10 microns and operation was at K-band. Transmission in the forward or direction 24 was about 3 db. (line 23) when operating in an applied external magnetic bias ($\beta_o$) of 10 kilogauss in the Z-direction (arrow 28 pointing into the paper of FIG. 2) and the backward loss in the direction 21 was = 15 db. (line 26). It is believed that a larger insertion ratio could be obtained by improving the impedance matching and by using a better absorber. It has been demonstrated therefore that by decreasing the thickness of the material so that the thickness is small compared to the wavelength of the particular frequency used in the particular semiconductor material, nonreciprocal semiconductor microwave devices operating at room temperatures without requiring magnetic fields greater than 50 kiloguass can be made. The best nonreciprocity or the ability to provide nonreciprocal microwave signal transmission is obtained when $\epsilon\omega = \sigma_x$, that is when the Hall conduction current is approximately equal to the displacement current and when $\sigma_X > \sigma_1$, that is the Hall angle is much greater than unity.

Where $\omega$ is the angular microwave frequency, $\epsilon$ is the dielectric constant of the material and $\sigma_x$ is the nondiagonal element of the conductivity tensor and for the above conditions is approximately equal to $ne/B_o$, where $n$ is the electron density, $e$ is the electron charge, $B_o$ is the external magnetic field intensity and where $\sigma_1$ is the diagonal element of the conductivity tensor. When the sample thickness $t$ is small as discussed in accordance with applicant's teaching, the following equation instead of $\epsilon\omega = \sigma_x$ must be used:

$$\epsilon\omega = \sigma_x k_z t = \frac{ne}{B_0}(k_z t) \text{ or } \sqrt{\mu_{o/\epsilon}} = (\sigma_x t)^{-1}$$

where $t$ is the sample thickness and $k_z$ is the propagation constant.

Thus the effect of the Hall current on the microwave field will be maximum if the sample impedance per unit length, expressed as $(\sigma_x t)^{-1}$, is nearly equal to the microwave impedance $Z_o$ of the waveguide structure in which the sample is inserted. It is estimated that the best isolation occurs when the above equation is satisfied; however the calculated value of $\sigma_x k_z t$, for the frequency used, is several times larger than $\epsilon\omega$ for $t = 10$ microns and a magnetic field of 10 kilogauss. Even though the equation above is not perfectly satisfied, nonreciprocal propagation has been observed. The differences between theory and observation are due to the assumption that the sample length is infinite in the propagation direction when the above equation us used. The lengths of these samples are made less than one-half of the free space wavelength so as to reduce the effective $\sigma_x$.

A waveguide circulator 30 is shown in cross section in FIG. 4. The circulator 30 comprises three rectangular waveguide sections 30*a*, 30*b* and 30*c* similar to that shown in FIG. 1 coupled together to a common region 32. The waveguides are arranged to allow for the propagation of electromagnetic signals in the $TE_{10}$ mode. The cross section is in the plane of the RF electric field with walls 34, 35 and 36 being the broad walls of the three waveguides. The circulator includes a semiconductor slab 31 mounted at the center of the rectangular waveguide series T configuration with the broad surface of the slab extending in the plane of the RF electric field of the electromagnetic wave and between the broad walls 34, 35 and 36 of the circulator. FIG. 5 illustrates the amount of attenuation for a given direction and strength of the magnetic field bias applied to the circulator of FIG. 4. For a magnetic field $\beta_o$ in the plus kilogauss direction of FIG. 5, the external magnetic bias is applied in the direction indicated in FIG. 4 as an arrow 33 pointing into the paper and marked by an ⊗ . Upon the application of, for example, a 10 kilogauss external magnetic field in the direction indicated by arrow 33 ⊗ into the paper, the signal in a test setup traveled from port 1 to port 2 with approximately 3 db. of transmission loss as indicated by curve 35. Signals traveling from port 2 to port 3 (curve 36), likewise undergo only about 3 db. of transmission loss. This 3 db. of attenuation in the forward direction was mainly due to mismatch. The attenuation of signals going in the opposite direction from port 1 to 3 (curve 37) as shown in FIG. 5, is of the order of 20 db. and therefore this clearly indicates the nonreciprocity of this circulator device. The sample thickness $t$ in the positive Z-direction or the direction which is into the paper as in the case of the isolator was made to be approximately 10 microns. By reversing the direction of the external magnetic field to the minus direction indicated by arrow 33*a* out of the paper , the coupling direction reverses as seen on the minus external magnetic bias in FIG. 5. The signals propagating from port 1 to port 3 (curve 37) at −10 kiloguass have a transmission loss of 3 db. Signals propagating in the port 1 to port 2 (curve 35) direction undergo greater than 20 db. of attenuation. While a transmission loss of about 3 to 4 db. was present in the coupling direction indicated, all but 1.5 db. of loss is believed to be due to reflection mismatch.

FIG. 6 shows a cross-sectional view of a waveguide power divider. The power divider comprises an ordinary rectangular waveguide section 40 like that shown in FIG. 1 and a dual waveguide section 41 and having a tapered section 42 therebetween. The waveguide sections are arranged to provide for the propagation of electromagnetic waves in the $TE_{10}$ mode, for example. The dual rectangular waveguide section 41 and tapered section 42 are separated by a conductive wall 44 extending in the plane of the internal RF magnetic field and centered parallel to the broad walls 41*a* and 41*b* of waveguide 41 so as to divide the dual waveguide 41 in the plane of the electric field equally into two parts 46 and 47. Each of the separate parts is guided from the ordinary rectangular waveguide 40 through the tapered waveguide section 42 having broad walls 42*a* and 42*b*. Each of waveguide parts 46 and 47 is capable of supporting electromagnetic waves in waveguide 40. A slab 43 of semiconductor material having a broad planar surface is coupled between the broad conductive walls 40*a* and 40*b* of the rectangular waveguide 40 with the broad planar surface of the slab 43 extending perpendicular to the broad conductive walls 40*a*, 40*b* and is in the plane of the electric field of an applied RF electromagnetic wave. The thickness $t$ of the slab 43 in the direction into the paper is made to be of the order of 14 microns. The material of slab 43 again in this example is $n$-type indium antimonide (InSb). FIG. 7 is a plot of transmission loss (db.) versus magnetic bias (kilogauss) for the arrangement shown in FIG. 6. A microwave signal 45 is applied at the left-hand side of the FIG. 6 in the direction of arrow 45. The magnetic field bias, indicated by an arrow 48 into the paper ⊗ is represented in FIG. 7 as the positive magnetic bias ($+B_o$). The magnetic field bias in the opposite direction, indicated by an arrow 49 coming out of the paper ⊙ is represented in FIG. 7 as the minus magnetic field ($-B_o$).

Referring to the curves 50, 51 illustrating magnetic field versus transmission loss shown in FIG. 7, for parts 46 and 47, it is seen that by changing the direction and strength of the magnetic field, a significant difference occurs in transmission loss between signals propagating in the lower part 46 of waveguide 41 or the upper part 47 of waveguide 41. The difference in the transmission loss between these two waveguide sections, (curves 50, 51 as illustrated) is about 10 db. when the externally applied field is applied in a positive direction, arrow 48, and has a strength of 10 kilogauss and this difference in transmission loss is a function of the external magnetic field intensity. Likewise, for an externally applied field in a negative direction, arrow 49, of 10 kilogauss magnetic field, an exchanged difference of 10 db. is noted (curves 50, 51) between the two waveguide sections 46, 47. By varying the strength and direction of the applied external magnetic field using the structure shown in FIG. 6, variable power divider is provided.

In another embodiment of the present invention, nonreciprocal transmission and phase shift is provided by an arrangement illustrated in FIG. 8. A partial perspective view of a waveguide 52 is shown in FIG. 8. The waveguide is, for example, a rectangular waveguide which is arranged so as to allow propagation of microwave signal energy at frequencies in the K-band in the $TE_{10}$ mode in the Y-direction as indicated by arrow 58.

A thin slab 53 of semiconductor material such as indium antimonide (InSb) is sandwiched between two thin slabs 54 and 55 of dielectric material. The combination of slabs 53, 54 and 55 is centered between the narrow walls 60 and 61 of the waveguide 52 and located asymmetrically in the waveguide. They are centered and extend in the plane of electric field of electromagnetic waves in the waveguide 52 adjacent to only one broad wall 56. The slabs do not extend to broad wall 57 of waveguide 52. The dielectric constant of the dielectric material of slabs 54, 55 is arranged so that, in combination with a semiconductor material such as indium antimonide, the microwave signal propagating in the waveguide is more strongly coupled with the semiconductor material.

As described previously, an external magnetic bias field is applied perpendicular to the direction of propagation and is perpendicular to the slabs 53, 54 and 55 and is along the surface of broad walls 56, 57. The external magnetic bias field indicated by arrow 59 in FIG. 8 is represented in FIG. 9 as in the positive bias ($+\beta_o$) direction and the external field indicated by arrow 59*a* is represented in FIG. 9 as in the negative bias ($-\beta_0$ direction. Both external magnetic fields are applied perpendicular to slabs 53, 54 and 55 as shown in FIG. 8. Signals propagating in one direction of the waveguide 50 undergo appreciable loss at a given amount of external magnetic bias and signals in the opposite direction of the waveguide undergo negligible loss or attenuation.

In the arrangement shown in FIG. 8 wherein the dielectric constant of the slabs 54 and 55 is 25 and the semiconductive material is indium antimonide and has a dielectric constant of 16, a change of transmission loss occurs as shown in FIG. 9 as a function of the external magnetic field. The lines 68, 69 and 70 in FIG. 9 refer to the change in transmission loss for the respective 11.2 mm., 12.1 and 12.7 mm. wavelength cases. In the 12.7 mm. wavelength case, there is a high degree of attenuation associated with an approximately 6 kilogauss external magnetic field in the positive Z-direction, and in the 12.1 mm. wavelength case, there is a maximum of attenuation upon the application of an external field at 2 kilogauss and low attenuation at the 6 kilogauss case. Also, for the 11.2 mm. wavelength case, as shown in curve 68, there is a relatively low attenuation on the positive side upon the application of an external magnetic field in the positive or Z-direction and maximum attenuation in the negative Z-direction with external magnetic bias on the order of −5 kilogauss. As can be seen in this arrangement, the dielectric material in the slabs 54 and 55 and the thin slab 53 of semiconductive material appear to change the microwave field distribution. Also, as can be seen in FIG. 9, a change of transmission loss occurs as a function of both the external magnetic field and the frequency. The relationship between the magnetic bias $\beta_0$ positive or negative Z-direction and the microwave frequency where maximum loss occurs is shown in FIG. 10, the positive direction corresponding to the application of an external magnetic field in the direction of arrow 59 and the negative direction corresponding to the application of an external magnetic field in the direction of 59*a*. As seen in FIG. 10, with an increase in frequency, the amount of magnetic field required to obtain maximum nonreciprocal transmission loss is reduced and changes with the external bias signals. Also, as noted in FIG. 10, to obtain maximum loss for a given frequency, the thickness of the material may be changed. The relationship of the various thicknesses where $t_1 < t_2 < t_3$ is shown in FIG. 10. If the frequency therefore is given, one can obtain maximum nonreciprocal transmission loss for a desired external magnetic field by selecting proper thickness of the semiconductive material. The lines 71, 72 and 73 in FIG. 9 illustrate the change in phase to the respective 11.2, 12.1 and 12.7 mm. waves. As shown in FIG. 9, the sharpest change in phase occurs at approximately the same external magnetic bias field value where the transmission loss change is maximum and the maximum phase shift occurs at the same approximate external bias point where the maximum transmission loss occurs. For the given thickness of dielectric material, maximum phase shift greater than 90°, for example, was obtained for applied signals having a wavelength of 12.1 mm. with an applied magnetic field of about +3 kilogauss as seen by curve 72 of FIG. 9. As described above in connection with transmission loss, maximum phase shift for a given frequency at a given magnetic field can be changed by changing the thickness of the dielectric material. By increasing the thickness of the dielectric material the amount of phase shift likewise increases.

In the above-described arrangement of FIG. 9 where 11.2, 12.1 and 12.7 mm. waves were applied, the device was operated at room temperature and the semiconductor slab was 3 mm. long ± 2.35 mm. wide ± 0.01 mm. thick and was InSb having a carrier concentration of about $10^{16}$ cm.$^{-3}$. The dielectric slabs 54 and 55 were 3 mm. long ± 2.35 mm. wide ± 0.7 m. thick and 3 mm. long ± 2.35 mm. wide ± 0.8 m. thick, respectively.

We claim:

1. A microwave circulator operable at room temperature comprising:

at least three waveguiding structures capable of propagating electromagnetic waves over a given range of frequencies coupled to a common region, each waveguiding structure having at least a first and second boundary, a thin slab of semiconductor material located at said common region and between said boundaries of each of said waveguiding structures, said slab having a broad planar surface, said broad planar surface being perpendicular to said conductive boundaries, means for coupling electromagnetic waves at a given range of frequencies to one of said waveguiding structures in a direction substantially parallel to said conductive boundaries, the electric field of said energy extending in the direction of said broad planar conductor, said slab of semiconductor material having a thickness in the direction of the portion of the magnetic field perpendicular to the direction of propagation of said energy which is less than 20 microns so that the impedance presented by said slab is nearly equal to the microwave impedance presented by said waves, and means for applying an external magnetic field substantially less than 50 kilogauss perpendicular to both the direction of propagation and the electric field whereby said electromagnetic waves coupled into one of said waveguiding structures couple nonreciprocally to the next adjacent waveguiding structure.

2. The combination as claimed in claim 1 wherein said semiconductor material is *n*-type indium antimonide and extends across said entire common region.

3. The combination as claimed in claim 2 wherein said waveguiding structures are rectangular waveguides capable of supporting electromagnetic waves in the $TE_{10}$ mode.

4. A waveguide power divider for controlling the microwave energy of electromagnetic waves coupled thereto comprising in combination:

a first waveguiding structure having at least a first and second conductive boundary, a second waveguiding structure having a cross section greater than that of said first waveguiding structure and having at least a third and fourth conductive boundary, a tapered waveguide section located between said first and second waveguiding sections, a slab of semiconductive material having a broad planar surface, said semiconductive material positioned between said first and second conductive boundaries with said broad planar surface extending perpendicular to said first and second conductive boundaries, a common conductive wall centered along the length of said second waveguiding structure between said third and fourth conductive boundaries and extending in the plane of said third and fourth boundaries of said second waveguiding structure, and means for applying an external magnetic field perpendicular to the broad surface of said slab and perpendicular to the direction of propagation of said microwave energy.

5. A waveguide power divider for providing variable power division of electromagnetic waves applied thereto comprising in combination:

a first rectangular waveguide structure, a dual rectangular waveguide structure having a cross section greater than that of said first waveguide structure and having a common conductive wall centered along the length of said section, extending in the plane of the magnetic field of the electromagnetic waves propagating in the structure, a tapered waveguide section located between said first waveguide section and said dual waveguide section, a thin slab of semiconductive material having a broad planar surface extended between the broad walls of said first rectangular waveguide, and means for applying an external magnetic field to said slab which is directed perpendicular to the broad planar surface of said slab and perpendicular to the direction of said applied electromagnetic waves.

6. The combination as claimed in claim 5 wherein the thickness of said semiconductive material in the direction of the applied external magnetic field has a value which results in said slab impedance per unit length being nearly equal to the microwave impedance presented to said electromagnetic waves by said first waveguide structure.

7. The combination as claimed in claim 6 wherein said semiconductive material is *n*-type indium antimonide and said thickness is less than 20 microns.